No. 725,576. PATENTED APR. 14, 1903.
C. F. MENDHAM.
APPARATUS FOR FILLING VESSELS WITH LIQUIDS.
APPLICATION FILED NOV. 6, 1902.
NO MODEL. 3 SHEETS—SHEET 1.
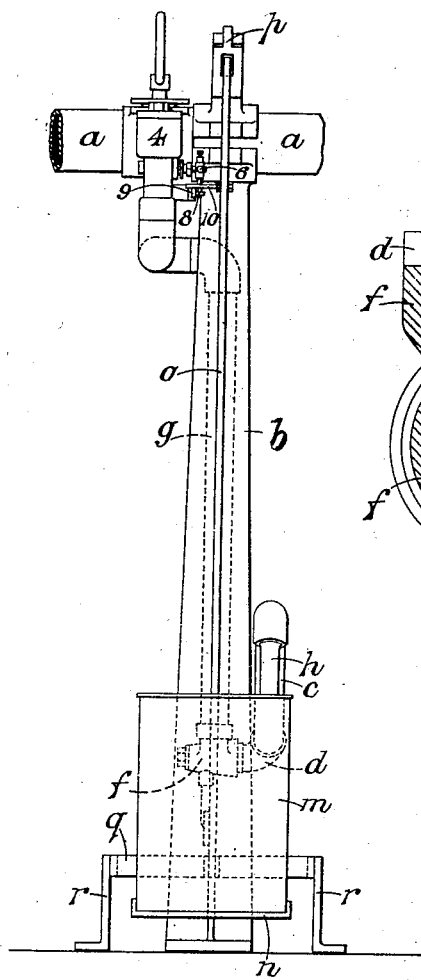
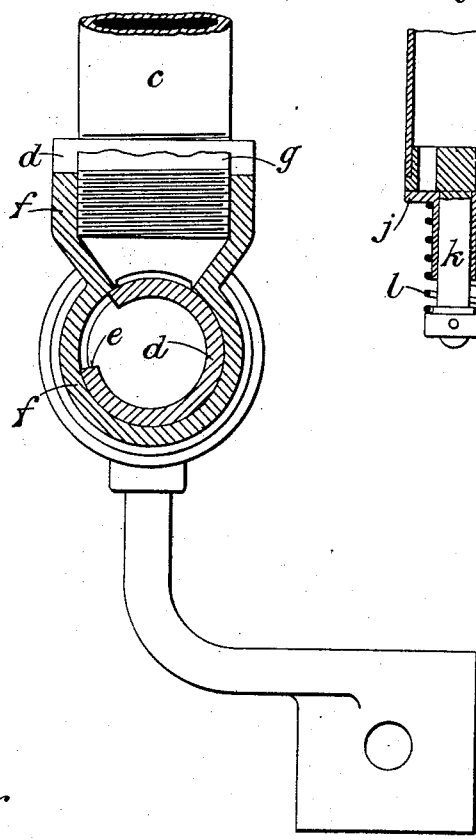
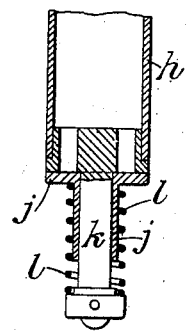

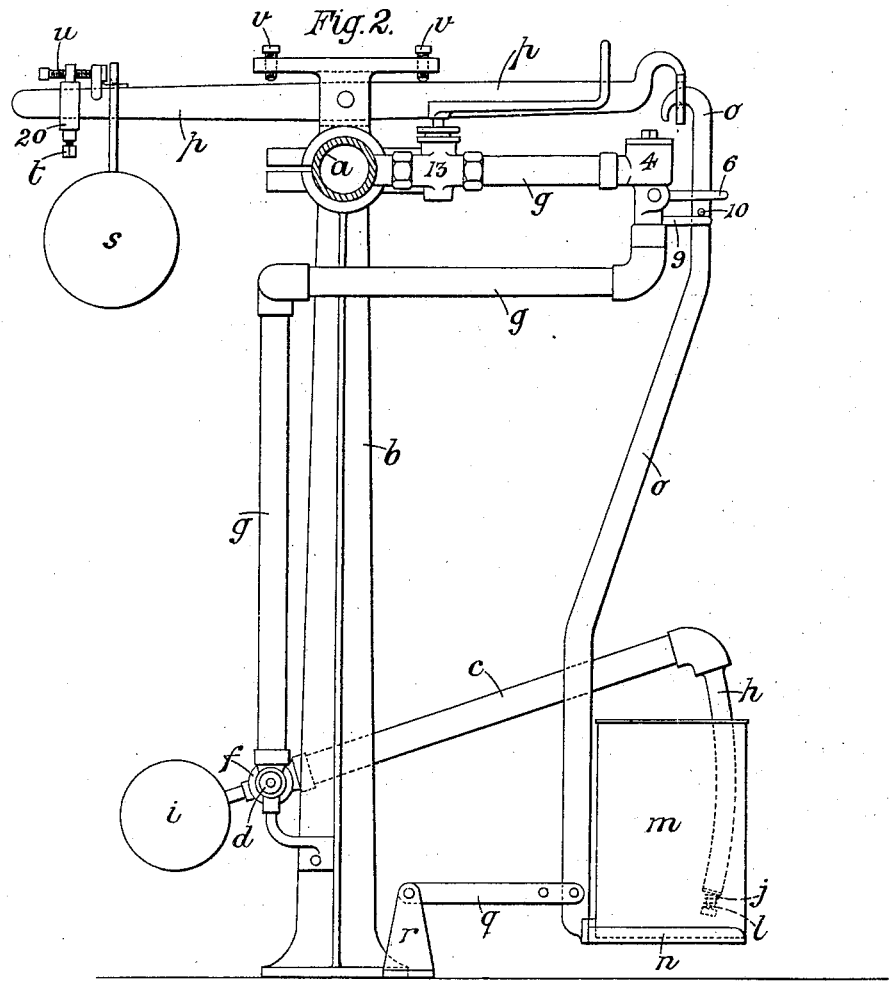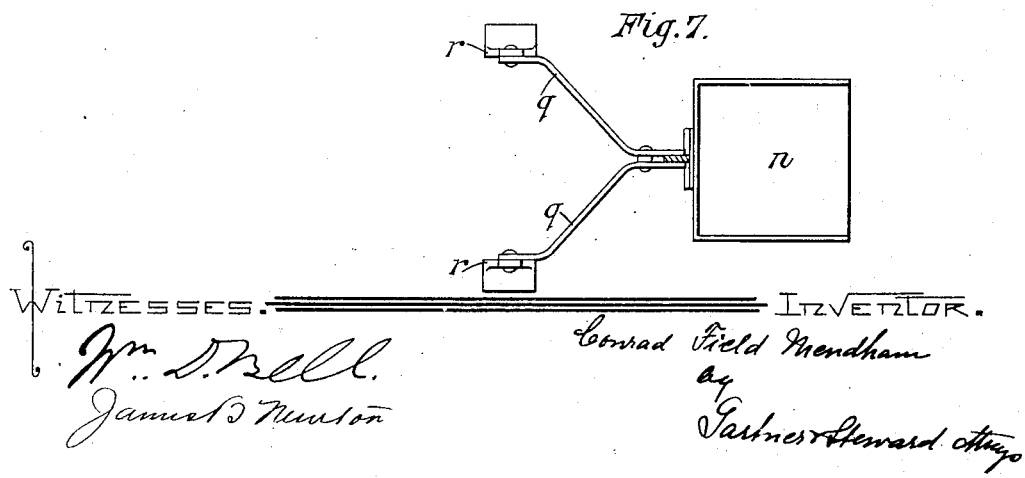

No. 725,576. PATENTED APR. 14, 1903.
C. F. MENDHAM.
APPARATUS FOR FILLING VESSELS WITH LIQUIDS.
APPLICATION FILED NOV. 6, 1902.
NO MODEL. 3 SHEETS—SHEET 3.
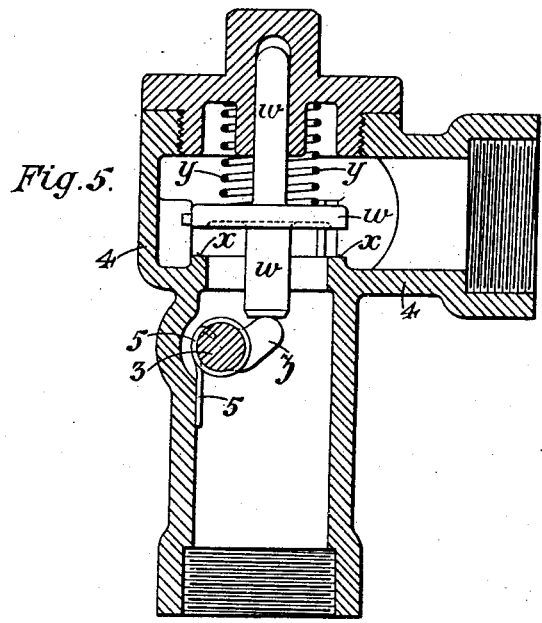
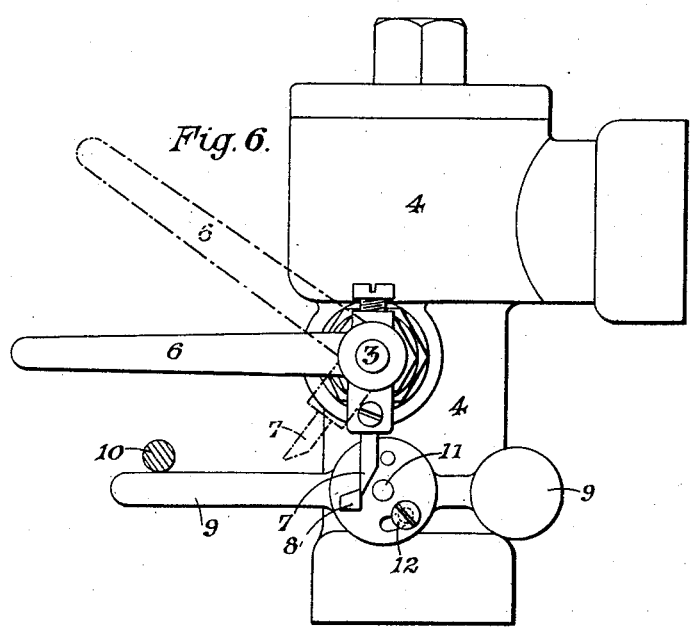

UNITED STATES PATENT OFFICE.

CONRAD FIELD MENDHAM, OF LONDON, ENGLAND.

APPARATUS FOR FILLING VESSELS WITH LIQUIDS.

SPECIFICATION forming part of Letters Patent No. 725,576, dated April 14, 1903.

Application filed November 6, 1902. Serial No. 130,335. (No model.)

*To all whom it may concern:*

Be it known that I, CONRAD FIELD MENDHAM, a subject of the King of Great Britain, residing at London, England, have invented certain new and useful Improvements in Apparatus for Use in Filling Vessels with Kerosene and other Liquids, of which the following is a specification.

My invention relates to apparatus for filling cans, drums, or other vessels with kerosene and other liquids, and is chiefly designed to provide means whereby the said vessels can be automatically and rapidly filled with exactly-measured quantities of liquid without frothing or spilling. For this purpose, according to my said invention, I provide a pivotally-mounted and counterbalanced pipe which is provided with an arc-shaped tubular extension preferably arranged concentrically with the axis of oscillation of the said pipe, the free end of the tubular extension being closed by a spring or like foot-valve adapted to be opened by the liquid in the said extension when the pressure therein exceeds a predetermined value. This arc-shaped pipe is passed into the can, drum, or other vessel, so that its lower end extends to or near to the bottom of the said vessel, while the vessel itself is supported on one arm of a balance-beam arranged, in combination with an automatic valve controlling the supply of liquid to the said pipe, in such a manner that when the weight of liquid in the said vessel reaches a predetermined amount the balance-beam will tilt and cause the automatic valve to shut off the supply of liquid. The lower end of the arc-shaped pipe being normally closed by the foot-valve thereon, any loss of liquid due to spilling during the transfer of the said pipe from a full vessel to the next empty vessel is prevented. Moreover, by allowing the liquid to enter the vessel near the bottom thereof the bulk of the said liquid enters the vessel below the level of the liquid therein, and thus the said liquid can be allowed to enter at a high pressure, and therefore at a rapid rate, without frothing.

My said invention, moreover, comprises various detail improvements hereinafter set forth.

In the accompanying drawings, Figure 1 is a front elevation, and Fig. 2 a side elevation, showing a filling-machine constructed according to my said invention. Fig. 3 is a central section showing a suitable form of foot-valve for use in my improved apparatus. Fig. 4 is a transverse section of a valve which simultaneously serves as a pivot for the said oscillating pipe and also as a means for shutting off the said pipe from the remainder of the liquid-supply system when the arc-shaped tubular extension is raised. Fig. 5 is a vertical section, and Fig. 6 is a side elevation, of an automatic valve for shutting off the supply of liquid when the balance-beam tilts. Fig. 7 is a plan showing the method of guiding the platform for supporting the vessel to be filled.

Like characters indicate corresponding parts throughout the drawings.

$a$ is a supply-main for the liquid. $b$ is a column or standard for supporting the said main and other parts of the machine.

$c$ is a pipe connected at one end with and opening into the interior of a tubular plug $d$, which is made with a port $e$. This plug turns in a shell or casing $f$, which is mounted on the standard $b$, and has a port connected through a pipe $g$ with the main $a$, so that the passage from the pipe $g$ into the pipe $c$ is closed when the pipe $c$ is raised, Fig. 4, and opened when it is depressed, Fig. 2. The other end of the pipe $c$ is provided with an arc-shaped tubular extension $h$, arranged concentrically with the plug $d$ and having a foot-valve at its lower end. The pipe $c$ and its extension $h$ are counterbalanced by a weight $i$. The said foot-valve, Fig. 3, consists of a flanged sleeve $j$, sliding on a fixed stem $k$ and normally held against its seat by a spring $l$, so as to keep the said extension closed except when the internal pressure exceeds a predetermined value. Any other suitable form of valve can, however, be employed for this purpose. By arranging the discharge of the liquid to take place at right angles to the axis of the pipe $h$ I am enabled to prevent the issuing liquid from impinging on the bottom of the vessel to be filled, and thus interfering with the action of the weighing device, to be hereinafter described.

The can or other vessel $m$ to be filled is placed on a platform $n$, which is supported by means of a hanger $o$ from one end of a balance-beam $p$, mounted on the top of the frame $b$, and the said platform is guided laterally by means of a link $q$, Fig. 7, which is pivotally connected thereto and to suitable fixed brackets $r$. The other end of the balance-beam $p$ bears a carriage 20 and counterweight $s$, the former of which can be locked in any desired position on the balance-beam by means of the set-screw $t$ and the latter of which can receive a fine adjustment by means of a leading-screw $u$, so as to enable the apparatus to be accurately set for filling the vessels with different weights of liquid, as required. The range of oscillation of the balance-beam $p$ is determined by means of set-screws $v$ $v$.

In the pipe $g$ is arranged a valve $w$, which opens against the direction of flow of the liquid and is pressed onto its seat $x$ by means of a spring $y$. The under side of the valve $w$ is acted upon by an arm $z$, mounted on a spindle 3, which is rotatably mounted in the valve-casing 4, and extends to the exterior through a stuffing-box, a weak spring 5 being provided for holding the arm $z$ in contact with the valve $w$. The spindle 3 is provided externally with a handle 6 for opening the valve and with a projection 7, preferably made of hardened steel, for engaging with a correspondingly-shaped projection 8 on a counterbalanced trigger-lever 9, so as to hold the valve $w$ open, as shown in Figs. 5 and 6. When the trigger-lever 9 is depressed by a pin 10 on the hanger $o$, the projection 8 releases the projection 7, whereupon the spring $y$ shuts the valve $w$ and raises the handle 6, as indicated in dotted lines in Fig. 6. The trigger-lever 9 is preferably pivoted at 11 on the casing 4 and is provided with a slot coacting with a pin 12 on the said casing for limiting its travel. A valve 13 is provided in the pipe $g$, so as to enable the supply of liquid to be shut off when the machine is not in use.

The operation of my improved apparatus is as follows: Assuming the can or other vessel $m$ resting on the platform $n$ to be empty and the handle 6 to be depressed—that is, the valve $w$ being open, as shown in Figs. 5 and 6, and the balance-beam $p$ tilted, so that the arm bearing the cam $m$ is raised—the oil or other liquid forces open the foot-valve $j$ and runs into the said can until the weight of oil therein reaches that for which the counterbalance-weight $s$ is adjusted, when the beam $p$ tilts and causes the pin 10 to depress the trigger-lever 9, thus releasing the valve $w$ and allowing it to close under the action of its spring $y$ and the pressure of the liquid in the supply-pipe $g$. The pipe $c$ is then raised by hand, so as to remove the extension $h$ from the interior of the can $m$, whereupon the said can or vessel can be removed and an empty one put in its place. A number of machines may be arranged at suitable distances apart along the main $a$, and the empty cans may be supplied at the left-hand side of the machine, as shown in Fig. 2, and the filled cans removed from the right-hand side, Fig. 2, or front thereof, thus always keeping them moving in a forward direction.

By my improved apparatus the vessels can be filled at a high pressure—for example, thirty to one hundred pounds per square inch—by unskilled labor without frothing or spilling of the liquid, at the same time insuring great accuracy in the amount of liquid put into each vessel.

What I claim as my invention, and desire to secure by Letters Patent, is—

1. The combination, in an apparatus for filling vessels with liquid, of a supply-main, a pivotally-mounted pipe communicating therewith, and an automatically-closing outwardly-opening valve at the free end of said pipe, substantially as described.

2. The combination, in an apparatus for filling vessels with liquid, of a liquid-supply main, a pipe having an arc-shaped extension and communicating with said main, a valve arranged between said pipe and said liquid-supply main, said valve serving as a pivotal connection between said pipe and said main and closing when said pipe is raised and opening when said pipe is depressed, and an automatically-closing outwardly-opening valve on the end of said extension, substantially as described.

3. The combination, in an apparatus for filling vessels with liquid, of a liquid-supply main, a pivotally-mounted pipe communicating therewith, an arc-shaped extension of said pipe, a counterbalance-weight connected with said pipe, and an automatically-closing outwardly-opening valve on the end of said extension, substantially as described.

4. An apparatus for filling vessels with liquid, said apparatus comprising a weighted balance-beam, a platform suspended from one arm of said balance-beam, a supply-main, a pivotally-mounted pipe communicating with said main, an arc-shaped extension of said pipe, said extension being concentric with the axis of oscillation of said pipe, an automatically-closing foot-valve on the end of said extension, a counterbalance-weight for said pipe and its extension, an automatic stop-valve between the main and the pivotally-mounted pipe, and means controlled by said balance-beam for releasing said stop-valve, substantially as described.

5. An apparatus for filling vessels with liquid, said apparatus comprising a weighted balance-beam, a platform suspended from one arm of said balance-beam, a supply-main, a pivotally-mounted pipe communicating with said main, an arc-shaped extension of said pipe, said extension being concentric with the axis of oscillation of said pipe, an automatically-closing foot-valve on the end of said extension, a counterbalance-weight for said pipe and its extension, a valve between said main and said pivotally-mounted pipe, means for automatically closing said valve, a rotatably-mounted arm for opening said valve, an external handle connected with said arm, a projection connected to said arm, a pivotally-mounted trigger-lever, a detent connected with said trigger-lever for engaging with said projection, and a projection connected with said balance-beam for acting on said trigger-lever, substantially as described.

6. An apparatus for filling vessels with liquid, said apparatus comprising a weighted balance-beam forming a weighing device, a platform suspended from one arm of said balance-beam, a supply-main, a pivotally-mounted pipe communicating with said main, a valve at the free end of said pipe, a counterbalance-weight for said pipe, a valve between said main and said pivotally-mounted pipe, means for automatically closing said valve, an arm for opening said valve, a projection connected with said arm, a pivotally-mounted trigger-lever, a detent connected with said trigger-lever for engaging said projection, and a projection connected with the weighing apparatus for acting on said trigger-lever, substantially as described.

7. The combination, in a machine for filling vessels with weighed quantities of liquid, of a liquid-supply main, a pivotally-mounted pipe communicating with said main, a counterbalance for said pipe, a platform for receiving said vessels, a weighing apparatus supporting said platform, a valve between said main and said pivotally-mounted pipe, means for automatically closing said valve, an arm for opening said valve, a projection connected with said arm, a pivotally-mounted trigger-lever, a detent connected with said trigger-lever for engaging said projection, and a projection connected with the weighing apparatus for acting on said trigger-lever, substantially as described.

In testimony whereof I have hereunto set my hand in presence of two subscribing witnesses.

CONRAD FIELD MENDHAM.

Witnesses:
J. W. PIERSON,
CHARLES ROOTEZ.